United States Patent [19]

Brooks

[11] Patent Number: 4,823,723
[45] Date of Patent: Apr. 25, 1989

[54] TROLLING RIG FOR FISHING BOATS

[76] Inventor: Kenneth J. Brooks, P.O. Box 31, Sante Fe, Tenn. 38482

[21] Appl. No.: 146,292

[22] Filed: Jan. 20, 1988

[51] Int. Cl.$^4$ .............................................. B63B 17/00
[52] U.S. Cl. .................................... 114/343; 43/21.2; 114/364; 248/512; 248/538
[58] Field of Search .......... 114/343, 364, 363, 221 R; 43/21.2; 248/512, 538

[56] References Cited

U.S. PATENT DOCUMENTS

| D. 194,611 | 2/1963 | Faulkner | 43/21.2 |
|---|---|---|---|
| 952,812 | 3/1910 | Jorgensen | 43/21.2 |
| 1,575,614 | 3/1926 | Blaw | 248/512 |
| 2,151,192 | 3/1939 | Crosser | 248/512 |
| 3,060,614 | 10/1962 | Prince | 43/6.5 |
| 3,623,766 | 11/1971 | Funk | 297/188 |
| 3,747,881 | 7/1973 | Akamu | 248/42 |
| 3,772,816 | 11/1973 | Ridge | 43/21.2 |
| 3,851,916 | 12/1974 | Quartullo | 297/188 |
| 4,157,803 | 6/1979 | Mack | 248/512 |
| 4,485,579 | 12/1984 | Hawie | 43/21.2 |
| 4,551,939 | 11/1985 | Kitchens | 43/21.2 |
| 4,603,500 | 8/1986 | Harrison, Sr. | 248/538 X |
| 4,782,624 | 11/1988 | Head | 43/21.2 |

Primary Examiner—Sherman D. Basinger
Attorney, Agent, or Firm—Luedeka, Hodges & Neely

[57] ABSTRACT

A rig for removably mounting a plurality of fishing rods on the deck of a fishing boat centrally of the aft end thereof, such rig comprising a plurality of rod holders mounted on the outboard end of an upright shaft that is received in a mounting bracket on the deck, each rod holder receiving the butt end of a rod such that the rod extends upwardly and outwardly with respect to the upright shaft, at least one rod being disposed on the starboard side of the boat and one rod being disposed on the port side of the boat. Optionally a third rod holder is provided for positioning a rod above and in alignment with the centerline of the boat and extending upwardly and outwardly above the boat motor.

4 Claims, 1 Drawing Sheet

TROLLING RIG FOR FISHING BOATS

FIELD OF THE INVENTION

This invention relates to devices for holding fishing rods in position for trolling operations and in particular relates to such devices for use with fishing boats of the "bass fishing" type having removable seats that are mounted in brackets secured in the deck of the boat.

Bass-type fishing boats are generally of relatively small construction and are designed primarily for freshwater fishing on lakes and streams where there is less likelihood of high waves or other rough waters. These boats usually are powered by an outboard motor mounted centrally on the transom of the boat and are operated from a location central of the boat. They also are provided with removable swivel seats adjacent the stern and aft ends of the boat, such seats commonly having a central shaft projecting from the bottom of the seat to be received in a well bracket mounted in the deck of the boat. In a preferred embodiment, the present invention is intended to be received in such well bracket for the aft seat when such seat is removed to thereby position the fishing rods centrally of the aft end of the boat behind the operator.

In certain locales it is lawful to utilize up to three fishing rods when sport fishing, such as when trolling for various species of fish. It will be recognized that tending three rods simultaneously requires some type of mechanical assistance based upon the fact that a person only has two hands and at least one hand should be free to tend to operation of the moving boat during trolling operations. When a fish is caught and being retrieved, both hands of the fisherman are required, thereby enhancing the need for mechanical aid in holding the several rods.

In trolling operations, it is common to cause the boat to drag the lure or bait at substantial distances, i.e. 50 to 150 feet, behind the boat over a suspected location of fish and if a fish is caught, then to turn the boat and again drag the lure or bait past the same location. Such turning of the boat often can be rather sharp and even when the fisherman is attending a single rod, close attention must be paid to not entangling a fishing line with the boat or motor during the turn. Such possible entanglement is increased when there are multiple lines extending rearwardly from the boat, plus such multiple lines introduce the further potential problem of entanglement of the several lines with one another during the turn. In the prior art it has been common to attach individual rod holders to the gunwale of the boat so that the rods and their associated lines would be as spaced apart as far as possible with the intent to minimize line entanglement.

When using gunwale mounted rod holders, one is able to mount only one rod on each side of the boat, thereby limiting the fisherman to the use of two rods during trolling, if maximum care is being taken to avoid entanglement of the lines. Still further, gunwale mounted rod holders are located a maximum distance from the fisherman thereby requiring substantial movement within the boat in attending the rods with resultant danger of falls within the boat or more seriously falling overboard. Such movements are especially dangerous when multiple fish are caught simultaneously, as frequently happens when trolling, and the fisherman is hurrying to reel them in.

It is therefore an object of the present invention to provide a rig for holding a plurality of fishing rods in a common mount on a boat during trolling.

It is another object to provide a trolling rig for holding a plurality of fishing rods which lessens the likelihood of line entanglement during turning of the fishing boat.

It is another object to provide a trolling rig for a fishing boat wherein the rig is centrally and conveniently located with respect to the fisherman/boat operator.

It is another object to provide a trolling rig suitable for mounting in the aft seat mounting bracket of a bass-type fishing boat when such seat is removed.

It is another object to provide a trolling rig for a plurality of fishing rods wherein the rods are commonly mounted centrally of the boat, i.e. over the boat keel.

It is another object of the present invention to provide a trolling rig which provides a centralized common pull against a plurality of fishing rods mounted therein.

Other objects and advantages of the present invention will appear from the description contained herein and the drawings in which.

DETAILED DESCRIPTION OF THE INVENTION

Figure 1:
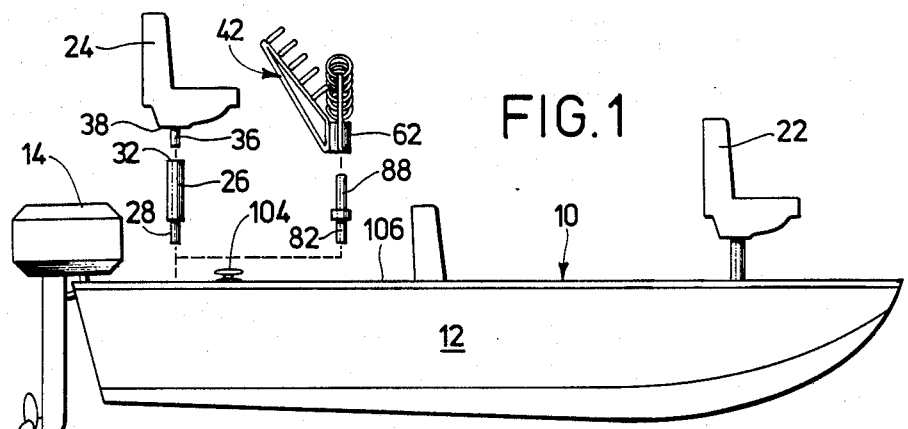
FIG. 1 is a representation of a bass-type fishing boat and depicting a preferred mounting location of the trolling rig of the present invention.

With reference to FIG. 1 the present invention is depicted for use on a fishing boat 10 of the "bass-type" referred to hereinabove. The boat includes a hull 12 with an outboard motor 14 mounted centrally of the transom of the boat. A control console 16 is provided centrally between the stern and aft sections of the boat and includes a seat (not visible) from which the fisherman operates the boat and keeps a watch on his fishing rods. A swivel seat 22 is mounted on the stern deck and like a swivel seat 24 is mounted on the aft deck. As seen from FIG. 1, the aft seat 24 is removably mounted by means of a shaft 26 having a reduced diameter portion 28 on one end thereof which is receivable in a well bracket 30 (see FIG. 3) secured in the aft deck and having a longitudinal opening in its opposite and outboard end 32 for receiving therein a stub shaft 36 that projects from the bottom 38 of the seat 24. Whereas the present disclosure makes specific reference to a "bass-type" boat, it is to be recognized that the present invention is useful with other fishing boats which include an aft deck section or like construction onto which there may be mounted a central well bracket in the nature of that disclosed herein.

Figures 2, 3:
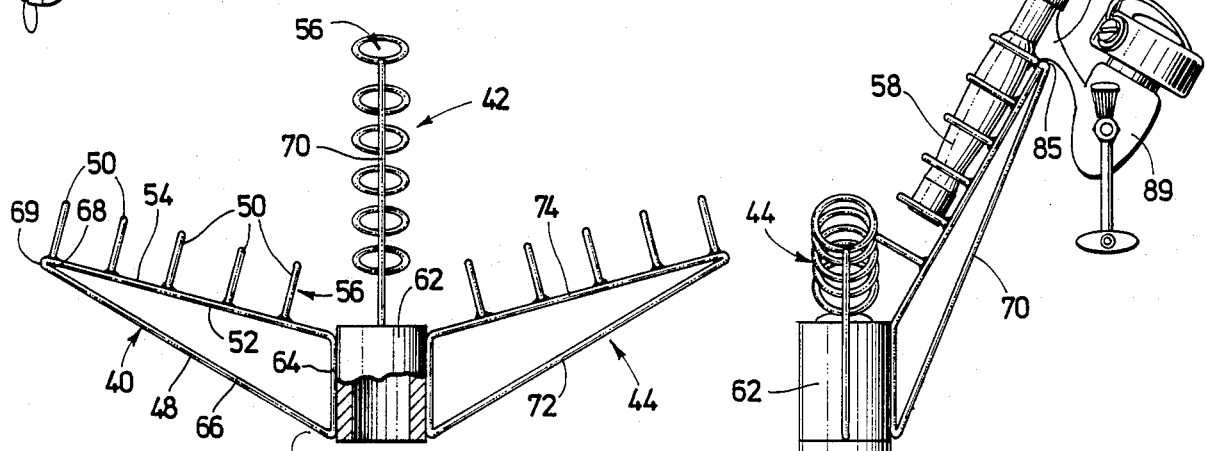
FIG. 2 is a partially exploded view depicting one embodiment of the present trolling rig.
FIG. 3 is a side view, partly fragmentary, showing the trolling rig of FIG. 2 as mounted on the deck of a boat and holding a rod in the central rod holder thereof.
Figure 4:
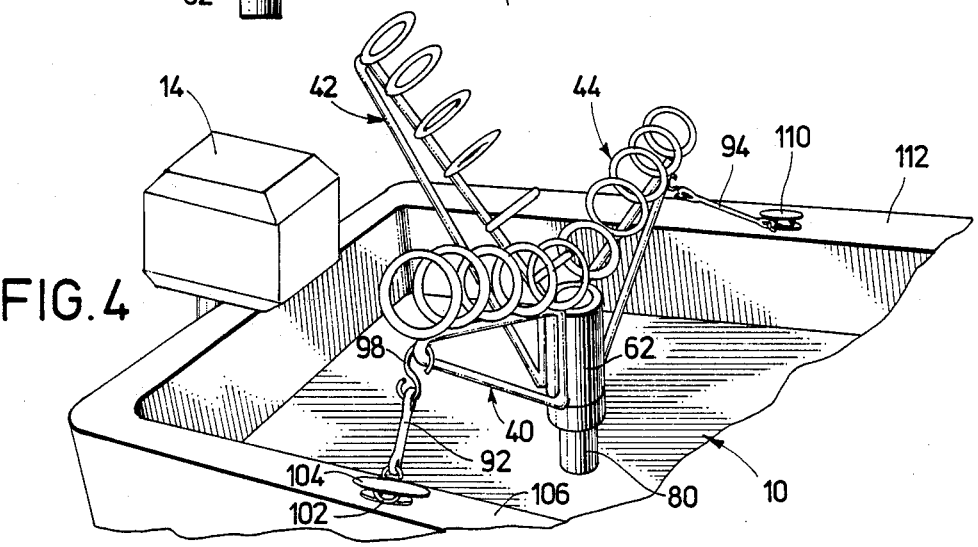
FIG. 4 is a perspective view of the trolling rig of the present invention and depicting various constructional details thereof.

As depicted in the several FIGS. the present trolling rig comprises a plurality of rod holders 40, 42 and 44. Each holder, in the depicted embodiment, includes a triangular bracket 48 having a plurality of rings 50 fixedly secured, as by welding, to one of its legs 52 at substantially equally spaced apart locations, e.g. one and one-half inches, on the outward edge 54 of the leg 52 such that the rings are parallel to one another, and substantially perpendicular to the leg 52. Their respective central openings are aligned to collectively define a tubular channel 56 that has a longitudinal axis which is substantially parallel to the leg 52. The individual rings are of a diameter that is appropriate for receiving therethrough the butt end 58 of a fishing rod 60 as depicted in FIGS. 3 and 4. Whereas a hollow tube could be substituted for the several rings on the leg 52, the rings are preferred because they permit the free passage of air therebetween to cause the evaporation of any water present on the rod handle and thereby ensuring the fisherman of a good grip on the rod handle when it is removed from the holder. Similarly, a perforated tube could be employed in lieu of the rings but at a greater expense and providing less aeration. In a preferred embodiment, the bracket 48 and the rings 50 are constructed of metal, but it is recognized that other materials of construction, such as plastics, may be used.

The bracket 48 is fixedly mounted to a central hollow hub 62 as by welding one leg 64 of the bracket to the outer circumference of the hub. In this manner, the bracket 48 projects radially outward from the hub and the leg 52 of the bracket projects upwardly at an angle, for example between about 95 and 135 degrees, and preferably about 110 degrees, with respect to the longitudinal axis of the hub 62. The further leg 66 of the bracket 48 serves as a reinforcement between the outboard end 68 of the leg 52 and the hub 62 to rigidify the bracket with respect to the hub.

Further brackets 70 and 72, each defining a rod holder as described hereinabove, are fixedly mounted, as by welding, to the hub 62 at locations radially spaced around the circumference of the hub. In a preferred embodiment, the brackets 48 and 72 are aligned in substantially diagonal opposition to one another and the bracket 70 is located midway between the brackets 48 and 72, or at a radial angle of about 45 degrees from either the bracket 48 or the bracket 72. It is to be noted that the bracket 70 is disposed on the aft side of the hub 62 and this bracket 70 is oriented at a greater upward angle than the brackets 48 and 72. Specifically, the leg 74 of the bracket 70 extends upwardly and outwardly of the hub 62 at an angle of about 145 degrees with respect to the longitudinal axis of the hub 62 thereby positioning the rod holder such that a rod held therein will project upwardly and over the outboard motor 14 and ensure that the line associated with this rod does not entangle with the motor.

The depicted hub 62 is mounted for rotational movement about its longitudinal axis on the outboard end 78 of a shaft 80. This shaft 80 is provided with a male end 82 of reduced diameter suitable for being received in the well bracket 30. As noted, the well bracket 30 is secured in the aft deck 81 as by screws 83. When so mounted in the well bracket, the shaft 80 projects upwardly from the deck a distance sufficient to position the hub 62 at a vertical height that is approximately at or above the height of the gunwales of the boat so that the rods held in the holders will be clear of the gunwales. In the depicted embodiment, the shaft 80 is provided with an annular shoulder 84 at a location between the opposite ends of the shaft which serves as a stop for the movement of the hub 62 downwardly upon the shaft 80. Preferably, this shoulder is integrally formed on the shaft 80, but may take the form of a collar which is fixed in the selected position, but as desired, the collar may be made adjustable as through the use of set screws or the like (not shown) as will be well recognized by one skilled in the art.

In accordance with one feature of the present invention, the juncture of the outboard ends 68 and 69 of the legs 56 and 66 of the bracket 48 is rounded to define a stop 85 for the insertion of the butt end of the fishing rod into the holder, such stop engaging the mounting arm 87 of a reel 89 mounted on the rod. This rounded stop ensures that the repeated insertion of the rod into its holder and/or any bouncing-type movement of the rod in its holder produces a minimum of stress upon the reel mounting arm thereby ensuring minimum deleterious effect upon the reel.

The preferred embodiment of the present invention is readily mountable in the well bracket for the aft boat seat, and therefore the rig is rotatable about the longitudinal axis of the hub 62 and the shaft 80 unless restrained against such rotation. Preferably, the rig is so restrained and in the depicted embodiment such restraint takes the form of a pair of flexible straps 92 and 94. The strap 92 is provided at one end thereof with a hook 98 which engages the bracket 48 and at its opposite end 100 with a further hook 102 which engages a cleat 104 on the starboard gunwale 106. A like strap 94 is connected between the bracket 72 and a cleat 110 on the port gunwale 112. Preferably, these straps are slightly elastic to facilitate their snug engagement between their respective anchor points. Adjustable length straps, employing buckles for example may be employed in lieu of elastic straps to provide for greater ranges of length adjustment. Other, but more expensive, means for securing the rig against rotation will be apparent, such as the use of keyways and keys between the shaft 80 and the well bracket 30 and between the shaft 80 and the hub 62. Splined connections at these locations also will provide for non rotation of the rig.

When mounted in the aft seat mount location, the present rig is sufficiently close to the boat transom to prevent contact of the line from either rod with the boat or the motor during relatively sharp turns or like maneuvers of the boat. This benefit is to be contrasted with the problem customarily encountered when turning a boat on which there are rods held in holders mounted on the boat gunwales where turning can only be about a radius that is large enough to prevent that line on the outside of the turning arc from angling into the aft section of the boat, or from dragging under the boat and entangling with the motor.

What is claimed is:

1. A rig for removably mounting a plurality of fishing rods in position for trolling from a forwardly moving boat comprising:

central hub means having a longitudinal axis;

a plurality of bracket means fixedly secured to and projecting outwardly and upwardly from said hub means, including first, second and third bracket means, said first and third bracket means being spaced substantially diagonally opposite one another on said hub, and said second bracket being disposed on the aft side of said hub when mounted on said boat and radially midway between said first and third brackets means;

means associated with each of said bracket means and defining an open channel for receiving the butt end of a fishing rod therein so that said rod projects upwardly and outwardly from said hub means; and means mounting said hub means at a location on the aft end of said boat between and within the port and starboard gunwales of said boat, and at a height sufficient to cause rods in said channels to project above said gunwales, whereby at least one of said bracket means is directed starboard of said boat and at least one of said bracket means is directed port of said boat.

2. The rig of claim 1 wherein said hub mounting means includes a well bracket mounted in the aft end of said boat, a shaft having one end thereof adapted to be received in said well bracket and having its opposite outboard end projecting upward from said well bracket to receive said hub thereon and including annular shoulder means encircling said shaft at a location intermediate the ends thereof and serving to limit the downward movement of said hub upon said shaft.

3. The rig of claim 2 including means for selectively limiting the rotational movement of said hub about its longitudinal axis and wherein said means limiting the rotational movement of said hub comprises first and second flexible strap means connected between said first and third brackets, respectively, and their respective adjacent gunwale.

4. In combination with a fishing boat of the bass-type including an aft deck section and a removable aft seat fitted in a well bracket mounted to said aft deck section, the improvement comprising a trolling rig mounted in said aft well bracket when said seat is removed therefrom, said rig including an upright shaft having one of its ends disposed in said well bracket, hub means mounted on the uppermost end of said shaft, nd a plurality of rod holders secured to said hub means at radially spaced apart locations thereon, and projecting outwardly and upwardly with respect to the upright longitudinal axis of said shaft, at least one of said rod holders being directed starboard of said boat and another of said rod holders being directed port of said boat.

* * * * *